(12) United States Patent
Cajanek et al.

(10) Patent No.: US 7,182,491 B2
(45) Date of Patent: Feb. 27, 2007

(54) HEADLAMP ADJUSTING SYSTEM PARTICULARLY FOR MOTOR VEHICLES

(75) Inventors: Stanislav Cajanek, Hukvaldy (CZ); Josef Wagner, Sr., Stary Jicin (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 181 days.

(21) Appl. No.: 11/083,785

(22) Filed: Mar. 18, 2005

(65) Prior Publication Data

US 2005/0231936 A1   Oct. 20, 2005

(30) Foreign Application Priority Data

Mar. 18, 2004   (CZ) .................................. 2004-386

(51) Int. Cl.
*F21V 21/10* (2006.01)

(52) U.S. Cl. ...................... 362/429; 362/419; 362/428; 362/514; 362/523

(58) Field of Classification Search ........ 362/418–419, 362/421, 427–429, 514–515, 523, 528, 530
See application file for complete search history.

(56) References Cited

U.S. PATENT DOCUMENTS 5,209,558 A * 5/1993 Suzuki et al. ............... 362/538
6,007,221 A   12/1999 Taniuchi et al.
6,241,373 B1 * 6/2001 Kelley et al. ............... 362/545
6,299,335 B1   10/2001 Shirai et al.
6,923,562 B2 * 8/2005 Leathley et al. ............ 362/514

FOREIGN PATENT DOCUMENTS

| DE | 199 37 374 A1 | 2/2001 |
|---|---|---|
| FR | 2 765 308 | 12/1998 |
| FR | 2 765 309 | 12/1998 |
| FR | 2 765 310 | 12/1998 |
| FR | 2 800 335 | 5/2001 |
| FR | 2 800 336 | 5/2001 |

* cited by examiner

*Primary Examiner*—Sandra O'Shea
*Assistant Examiner*—Jason Moon Han
(74) *Attorney, Agent, or Firm*—Brinks Hofer Gilson & Lione

(57) ABSTRACT

A headlamp adjusting system, particularly for motor vehicles, includes a headlamp body and optical system having reflector and regulating elements for adjustment and fixation of the reflector. The reflector is carried by a part of a pivot holder that, by means of a weakening hinge, allows swinging movement of the central portion of the pivot holder. The fixed portion of the pivot holder is connected to the headlamp body. A socket for holding an end of the regulating element is provided at the free side of the pivot holder. For adjustment of the reflector in two mutually different planes, the central part of the pivot holder is swingable by means of two hinges.

8 Claims, 2 Drawing Sheets

HEADLAMP ADJUSTING SYSTEM PARTICULARLY FOR MOTOR VEHICLES

BACKGROUND

1. Technical Field of the Invention

The present invention relates to a headlamp adjusting system particularly for motor vehicles and especially relates to fixation and setting of the optical system inside the reflector for motor vehicles.

2. Related Technology

An optical system, usually consisting of the paraboloidal reflector or elliptic-dioptric unit, is conventionally fastened by means of three-point mounting. At least two of these points, represented by spherical seatings, are slideable so that the adjustment of the optical system in the horizontal and vertical planes is allowed.

This method is satisfactory, in particular for the paraboloidal reflectors made from materials having higher mass, because the arrangement of the fastening points on the edges of the reflector can assure the sufficient stability of the optical system in the headlamp body.

However, if the thermoplastic materials with a low mass and thin walls are used for the paraboloidal reflector, then the above mentioned stress and the thermal dilatation on the edges of the reflector may cause its deformation and, therefore, the stability of the light beam is unfavorably influenced.

A further disadvantage exists in that a large number of separate parts, necessary for adjustment, as well as a large number of mountings elements, for their attachment to the reflector and headlamp body, are needed.

SUMMARY

An object of the present invention is to eliminate the above mentioned disadvantages of the prior art.

Accordingly, the present invention provides a headlamp adjusting system, particularly for motor vehicles, comprising a headlamp body, an optical system with a paraboloidal reflector or elliptic-dioptric unit, and regulating elements for adjustment and fixation of the optical system's position.

The optical system is fixed in the central part of a pivot holder, which is by means of a weakening hinge, allowing, due to its elasticity, a swinging movement of the pivot holder, connected to the headlamp body, wherein a socket for holding a regulating element is provided at the free side of the pivot holding.

In a preferred embodiment according the present invention, for adjustment of the optical system in two mutually different planes, the central part of the pivot holder is swinging by means of the hinge, wherein its position is adjustable by means of a stud located in a nut, which is firmly joined to the pivot hodler.

In a further preferred embodiment according to the present invention, the pivot holder carrying the optical system is a part of the headlamp body, wherein a weakening hinge connects a pivot holder to one side of the service opening in the headlamp body.

BRIEF DESCRIPTION OF THE DRAWINGS

The preferred by not limiting, embodiment of the present invention is described below with reference to the accompanying drawings, in which.

DETAILED DESCRIPTION

Figure 1:
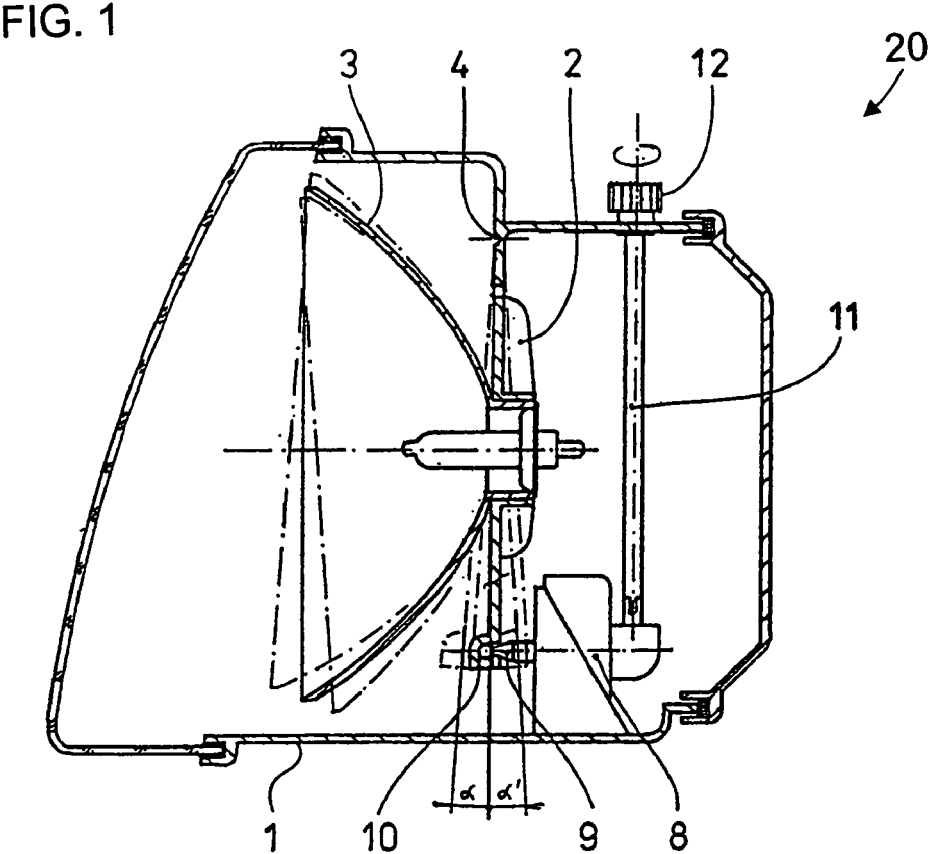
FIG. 1 is a view in vertical cross-section of the headlamp showing the vertical adjustment.

Referring now to the drawings, the optical system 20 includes a paraboloidal reflector or elliptic-dioptric unit (hereinafter called as reflector 3) fixed in the area of the socket bulb to a plastic pivot holder 2. The pivot holder 2 is, at the point of required swiveling, weakened into a narrow bridging hinge that allows, due to its elasticity, a swinging movement of the pivot holder 2. In view of the fact that an angle, necessary to incorporate the whole range of the headlamp adjustment, is about ±5°, the actual bending of the weakened bridging hinge is minimal and has no negative influence on the stability and lifetime of the present system 20.

In case of need to adjust the reflector 3 in both vertical and horizontal planes (what is the usual requirement for low beam light), a further and second bridging hinge is provided on the pivot holder 2 carrying the reflector 3. This bridging hinge is oriented so that the swinging movement of the reflector in required plane is allowed.

The reflector 3 is fixed in the pivot holder 2 and arranged in the headlamp body 1. The pivot holder 2 is weakened at two points so that two swinging parts perpendicular one another are provided. The weakening hinge 4 enables a movement of the pivot holder 2 in the vertical plane in a range of angles $\alpha$ and $\alpha'$ (seen in FIG. 1), and the hinge 5 enables a movement of the central part of the pivot holder 2 horizontally in a range of angles $\beta$ and $\beta'$ (seen in FIG. 2).

Figure 2:
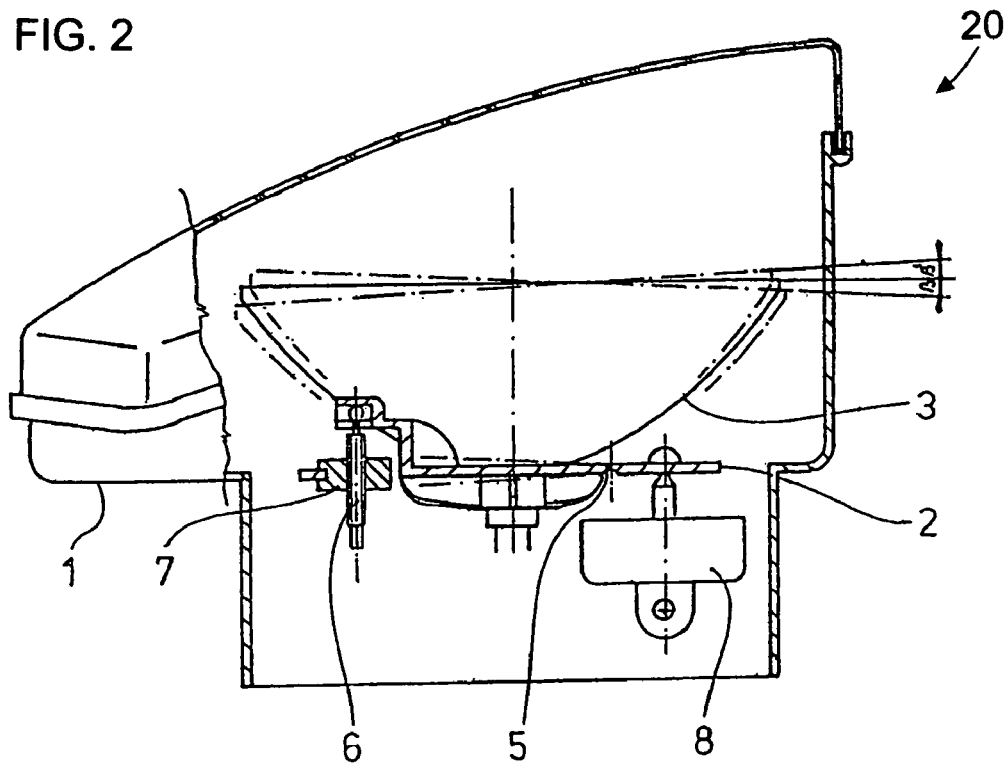
FIG. 2 is a view in horizontal cross-section of the headlamp showing an arrangement of the component parts for horizontal adjustment.
Figure 3:
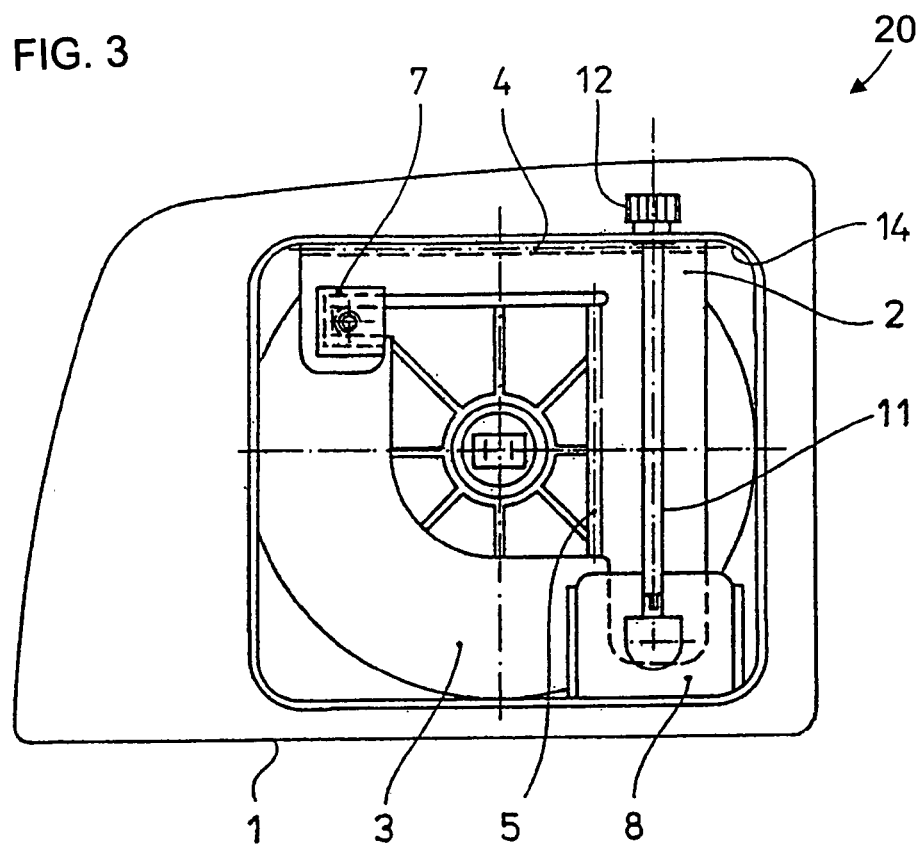
FIG. 3 is a view of the back part of the headlamp.

In view of the fact that the need to adjust the horizontal position of the reflector is less frequent, this adjustment is carried out by means of a threaded stud 6 located within a nut 7. The nut 7 is secured to a fixed or immoveable portion of the pivot holder 2, while spherical end of the stud 6 is received in a seat or socket provided in a moveable or swinging part of the pivot holder 2. By advancing or retracting the stud 6 relative to the nut 7, the reflector 3 pivots about the weakened hinge 5 and is adjusted as indicated in FIG. 2.

Vertical adjustment is usually effectuated by an electric motor 8 configured to extend and retract an actuator 9. The actuator 9 of the electric motor 8 includes a spherical end that is received and fixed in a socket 10 provided in the pivot holder 2.

Additionally or alternatively, manual adjustment of the vertical position is carried out by means of an actuating shaft 11. Rotation of the shaft 11 adjusts the actuator 9 of the electric motor 8. The end of the shaft 11 passes through an opening in the headlamp body 1 and is provided with a termination that is adapted for application of adjusting tools or other means. By advancing or retracting the actuator 9, either electrically or manually, the pivot holder 2 is caused to pivot, swivel or hinge about the weakening hinge 4, resulting in adjustment of the reflector 3 as indicated by the phantom lines of FIG. 1. As such the weakening hinge 4 connects the pivot holder 2 with one side of the service opening 14, which is not moveable, in the headlamp body 1.

Figure 4:
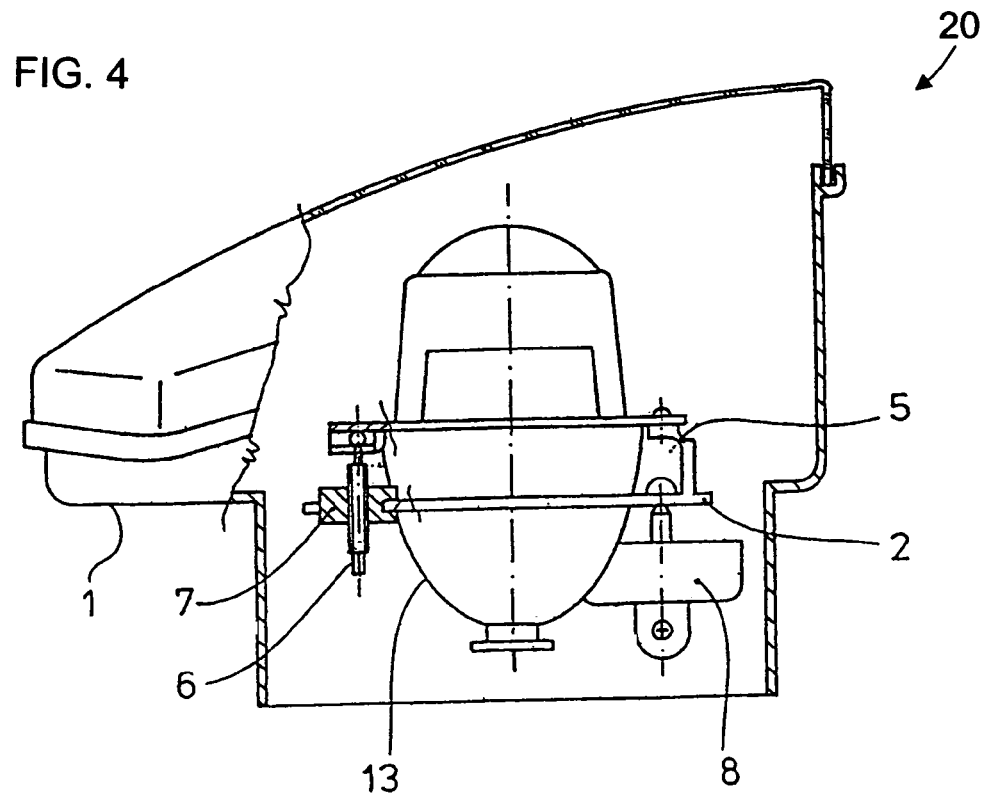
FIG. 4 illustrates an embodiment of the headlamp with an elliptic-dioptric unit.

Illustrated in FIG. 4 is an alternative embodiment of the system 20 wherein the reflector 3 and its lamp are replaced with an elliptic-dioptric unit 13. In this embodiment, a part of ellipsoidal reflector of the unit 13 is advantageously used for fixing of the spherical end part of the stud 6 for horizontal adjustment, the reflector of the unit being connected opposite thereof to the pivot holder 2 at the weakened hinge 5.

The above described pivot holder allowing the movement of the reflector can be advantageously formed as a part of the headlamp body. Therefore, it is not necessary to manufacture a separate part, as well as to arrange its fixation. In view of the fact that the reflector is fixed on the pivot holder in the area around the socket of bulb, then the deformation of the reflector due to its thermal dilatation or expansion is substantially reduced. Furthermore, by means of the unique arrangement of the headlamp according to the present invention, the number of its component parts is substantially decreased. Arrangement of the regulating elements for the headlamp according to the present invention is intended to be used for the position adjustment and control of the optical systems in the field of lighting engineering for motor vehicles.

What is claimed is:

1. A headlamp adjusting system particularly for motor vehicles comprising:
    a headlamp body;
    an optical system including a reflector and a regulating element for adjustment and fixation of the position of the optical system; and
    wherein the reflector is fixed in a central part of a pivot holder connected to the headlamp body, the pivot holder including a weakening hinge allowing due to its elasticity a swinging movement of the central part of the pivot holder, a socket is provided at a free side of the central portion of the pivot holder and the socket engages the regulating element whereby extending and retracting of the regulating element causes hinging of the central portion at the weakening hinge and causes adjusting of the reflector.

2. The headlamp adjusting system according to claim 1, further comprising a second weakening hinge of the pivot holder whereby the reflector of the optical system is adjustable in two mutually different planes.

3. The headlamp adjusting system according to claim 1 wherein the regulating element includes a threaded stud located in a nut.

4. The headlamp adjusting system according to claim 3 wherein the nut is connected to the pivot holder.

5. The headlamp adjusting system according to claim 4 wherein the nut is connected to a fixed portion of the pivot holder.

6. The headlamp adjusting system according to claim 1, wherein the pivot holder is a part of the headlamp body and the weakening hinge connects the pivot holder to one side of a service opening in the headlamp body.

7. The headlamp adjusting system according to claim 1 wherein the reflector is a paraboloidal reflector.

8. The headlamp adjusting system according to claim 1 wherein the reflector is an elliptic-dioptric unit.

* * * * *